United States Patent
Buck et al.

(10) Patent No.: US 6,437,475 B1
(45) Date of Patent: Aug. 20, 2002

(54) ROTOR SLIP RING AND METHOD OF COIL TO SLIP RING TERMINATION

(75) Inventors: Derrick S. Buck, Pendleton; George William Brutchen, Winchester, both of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/723,500

(22) Filed: Nov. 28, 2000

(51) Int. Cl.[7] .................. H02K 13/00; H02K 13/02; H01R 39/34
(52) U.S. Cl. .................................. 310/232; 310/71
(58) Field of Search ............... 310/232, 71; 29/507; 174/138 R; 361/245

(56) References Cited

U.S. PATENT DOCUMENTS

| | | | | |
|---|---|---|---|---|
| 1,431,295 A | * | 10/1922 | Evans | 310/232 |
| 1,870,236 A | * | 9/1932 | Chervenka | 310/232 |
| 2,718,604 A | * | 9/1955 | Herrick | 310/232 |
| 4,406,961 A | * | 9/1983 | Pflueger et al. | 310/232 |
| 4,588,911 A | | 5/1986 | Gold | 310/62 |
| 4,645,962 A | * | 2/1987 | Freeman | 310/232 |
| 4,961,016 A | | 10/1990 | Peng et al. | 310/62 |
| 4,992,691 A | | 2/1991 | Mlynarz | 310/232 |
| 5,625,244 A | | 4/1997 | Bradfield | 310/232 |

FOREIGN PATENT DOCUMENTS

| | | | | |
|---|---|---|---|---|
| DE | 3248219 A1 | * | 7/1984 | H02K/13/02 |
| GB | 2029122 | * | 3/1980 | H02K/13/00 |

* cited by examiner

Primary Examiner—Burton S. Mullins
(74) Attorney, Agent, or Firm—Margaret A. Dobrowitsky

(57) ABSTRACT

A slip ring assembly includes an insulator body with an rotor-facing first side and second, opposing side, and a pair of slip rings. The slip rings are formed to include respective coupling terminals that generally axially extend from the second side of the insulator body. The insulator body further includes a pair of through-bores that are parallel to but radially offset from a main axis of the insulator body, and are configured for routing the rotor winding leads from the rotor-facing side of the insulator body to the second, opposing side. The coupling terminals each comprise a pair of radially inwardly extending legs and a central, axially extending leg. The leads emerge from the through-bores, and are folded over the radially extending legs. The central, axially extending leg is then folded over the lead to mechanically secure the lead end, which is soldered to ensure electrical connectivity.

17 Claims, 3 Drawing Sheets

ROTOR SLIP RING AND METHOD OF COIL TO SLIP RING TERMINATION

BACKGROUND OF THE INVENTION

1. Technical Field

The present invention is directed toward rotating electric machines having a slip ring.

2. Description of the Related Art

A conventional alternator 10 is illustrated in FIG. 1 sometimes referred to herein as a generator. Alternator 10 has a rotor assembly generally designated by the reference numeral 20 and stator assembly generally designated by the reference numeral 15. The rotor assembly 20 includes a shaft 21 supporting all rotating magnetic circuit structures thereof including conventional pole-members 16A and 16B, rotor core 17 and field coil 18 wound upon bobbin 12. Additionally, all other non-magnetic circuit rotating structures are carried thereby, including air circulation fans 19 and 27 located at axially opposite sides of the pole-members, and a slip ring assembly 30 located at one extreme end of the shaft. Fan 27 is formed from sheet metal stock and spot welded to pole-member 16B while fan 19 is formed from an appropriate thermoplastic material and is ultrasonically welded to tower extensions (not shown) from the field coil bobbin 12. The shaft 21 in turn is rotatably supported within a housing 26 by a pair of bearings 23 and 22. Bearing 23 is located between the slip ring assembly 30 and the fan 19.

Coil leads 18A of field coil 18 are wrapped about respective posts 12A of bobbin 12 and pass through holes 13 in fan 19. Slip ring assembly 30 is made of a pair of copper rings 31, each having a slip ring lead 32 joined such as by welding thereto. The copper rings and wires are molded into a thermoset material to complete the slip ring assembly. A one-piece slip ring assembly is disclosed in U.S. Pat. No. 4,961,016 issued to Gold. Slip ring assembly 30 is pressed onto the end of rotor shaft 21 and the slip ring leads 32 are routed into channels along the shaft 21 where they are joined, such as by twisting and welding, to the coil leads 18A of field coil 18 via a joint 24. The joint 24 is then bent to the surface of the fan 19 and received in a pyramid-shaped tab structure 25. The joint 24 is then secured to fan 19 by ultrasonic welding of the plastic material of the tab 25. Bearing 23 is assembled to pass over the slip ring assembly 30 to retain the lead wires 32 securely within the shaft channels. The configuration in FIG. 1, however, presents several manufacturing challenges which may affect long-term durability.

First, the weld connection at joint 24 may be made imperfectly, for example, where the weld bead contains a partial crack or fissure. Such a joint will normally pass electrical tests conducted during manufacture. However, during the service life of generator 10, the rotational forces (i.e., centrifugal forces) that come to bear on joint 24, either directly or indirectly (e.g., via flexure of the fan body) may cause the crack to propagate until the electrical connection is broken entirely, resulting in an open condition in the field winding circuit. This will cause the generator to fail.

Second, the above-mentioned ultrasonic welding operation may incompletely melt the plastic in the vicinity of the joint 24, resulting in gaps or voids. These gaps or voids may allow the wires or joint 24 itself to move during operation of the generator (i.e., rotation of the rotor). This movement may fatigue the metal, causing it to break, resulting in an open circuit and failure of the generator. Additionally, a weld horn that is used in the ultrasonic welding operation may contact the wires or joint 24 directly (not just the tab 25). The high vibration imparted by the weld horn may fatigue the wires or joint 24, perhaps not severe enough to cause a break that could be detected during manufacture via electrical testing. Moreover, the weld horn may crush, flatten or otherwise deform the wires or joint, thereby weakening it. The wires/joint, thus weakened, may fail during operation of the generator.

Third, slip ring conductor 32 may be pulled too tight when joint 24 is made, causing it to rise slightly out of the channel in the shaft and fan hub where it is designed to reside. Bearing 23, when assembled onto shaft 21, may contact conductor 32, deforming or possibly cutting the wire's outer insulation. Such a condition will ground the rotor winding, causing the generator to fail.

Fourth, the connection of conductors 32 to respective slip rings 31 is conventionally made via brazing or welding. As shown in FIG. 1, the slip ring connections are located near a radially outermost portion of the slip ring assembly 30 itself. Rotational forces increase with increases in distance from the main axis, and may therefore weaken such connections, causing some to fail.

U.S. Pat. No. 5,625,244 to Bradfield discloses a slip ring assembly having channels for capturing coil leads and routing them through the slip ring assembly to an axially outermost end. The channels, however, are disclosed as being of uniform size, allowing an insulating sleeve associated with the coil leads to emerge from the slip ring assembly and possibly interfere with an electrical connection. In addition, the channels route the coil leads near a radially outermost portion of the slip ring assembly, subjecting the leads/connections to an increased centrifugal force, increasing the chance of a failed electrical connection.

There is therefore a need for an improved generator that minimizes or eliminates one or more of the problems as set forth above.

SUMMARY OF THE INVENTION

An object of the present invention is to provide a solution to one or more of the problems set forth in the Background. An advantage of a slip ring assembly in accordance with the present invention is that it reduces the number of electrical connections compared to conventional designs. This reduced number of connections reduces manufacturing complexity and improves durability. Another advantage is that it provides a more robust mechanical and electrical slip ring connection, inasmuch as it is subjected to reduced centrifugal forces by being located nearer the main axis of the slip ring assembly. Yet another advantage is that interference of an insulating sleeve associated with the rotor coil leads is reduced, via routing through-bores that have a reduced diameter exit aperture, preventing the sleeve from exiting.

These and other features and advantages are achieved by a slip ring assembly in accordance with the present invention. A slip ring assembly is provided for supplying current to a rotor winding of a rotor of an alternating current generator and includes a body portion having a main axis formed of electrical insulating material, the insulator body having a central bore configured to be secured to a rotatable rotor shaft, the body portion having first and second opposing ends, the first end configured to face the rotor, a pair of spaced electrically conductive slip rings engaging the body portion, each slip ring having a respective coupling terminal extending from the second end of the insulator body portion, characterized in that the body portion has a pair of longitudinally extending through-bores configured to allow rotor winding leads to pass from the first end to the second end.

BRIEF DESCRIPTION OF THE DRAWINGS

The present invention will now be described by way of example, with reference to the accompanying drawings, in which.

DETAILED DESCRIPTION OF THE PREFERRED EMBODIMENTS

Figure 1:
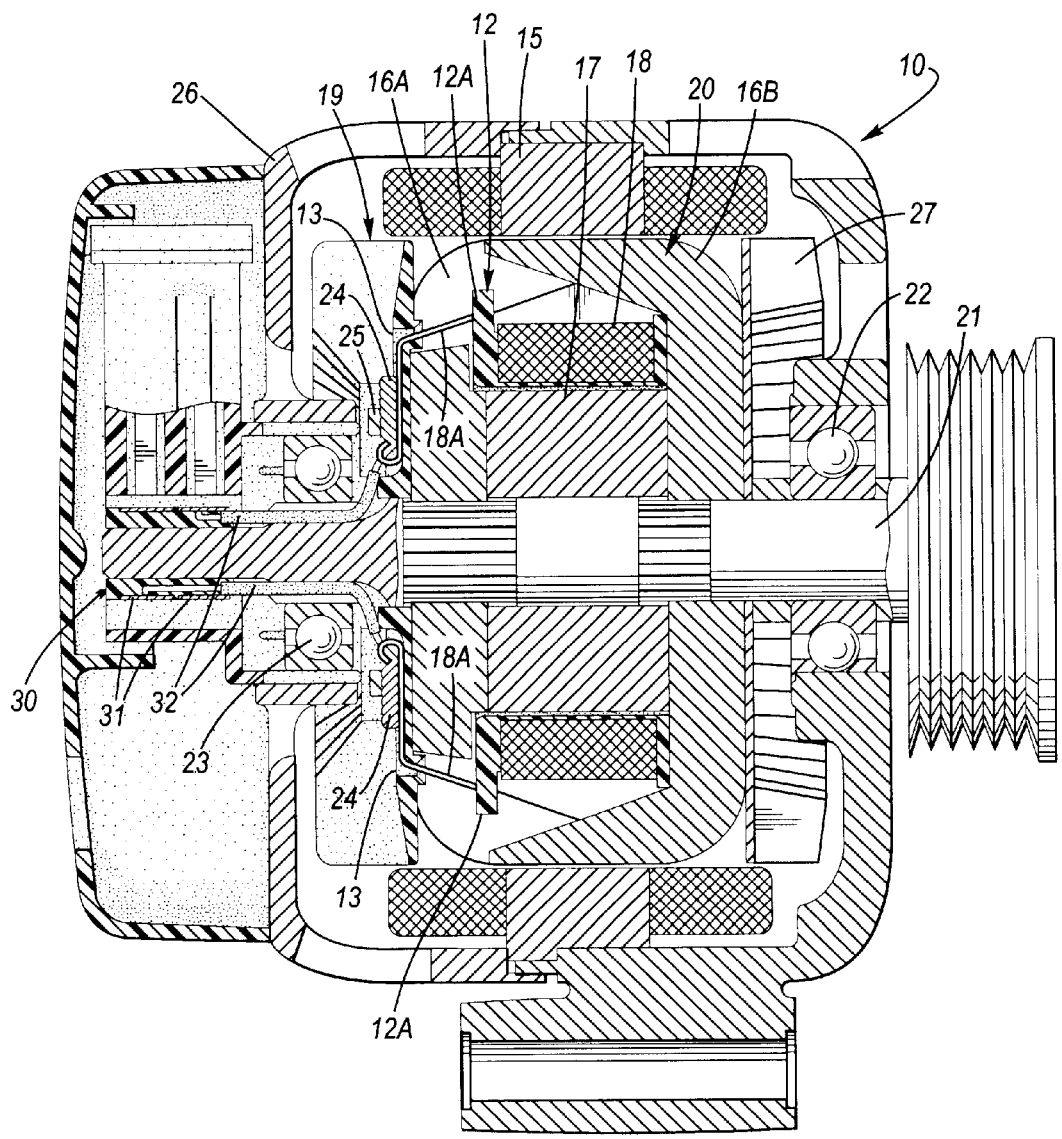
FIG. 1 is a sectional view through a conventional alternator having a slip ring assembly.
Figure 2:
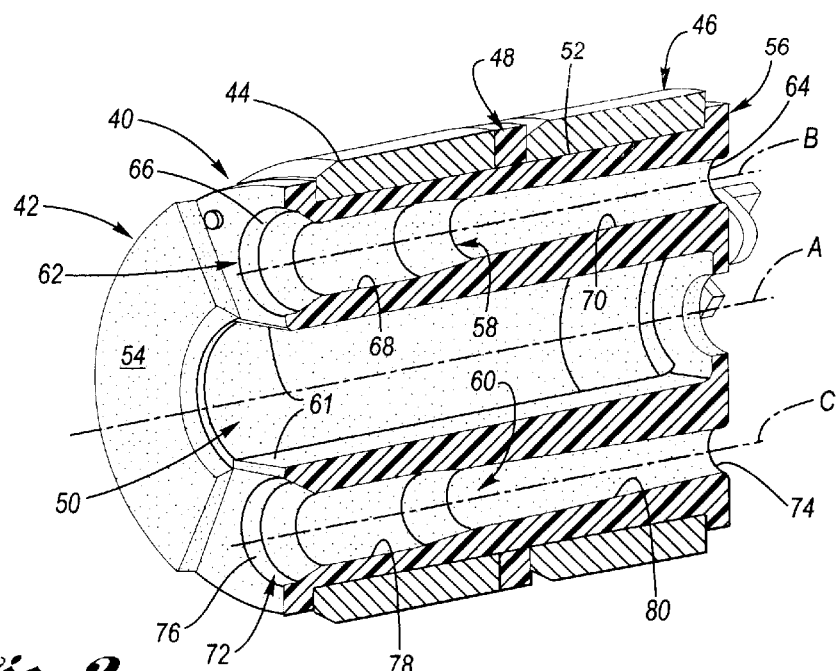
FIG. 2 is a perspective, cross-sectional view of a slip ring assembly according t the present invention showing a first side configured to face the rotor.

Referring now to the drawings wherein like reference numerals identify like components in the various views, FIG. 2 is a simplified perspective, section view of a slip ring assembly 40 in accordance with the present invention. Slip ring assembly 40 is substantially cylindrical at its outer diameter and includes a body portion 42, a first slip ring 44, a second slip ring 46 and a spacing element such as an electrically insulating washer 48.

Body portion 42 has a main axis designated "A" in the drawings, and is formed of electrical insulating material. In the illustrated embodiment, body portion 42 includes a central bore 50, an outer surface 52 that is generally cylindrical in shape, a first rotor-facing end 54, a second end 56 opposite first end 54, a first through-bore 58 and a second through-bore 60.

Figure 5:
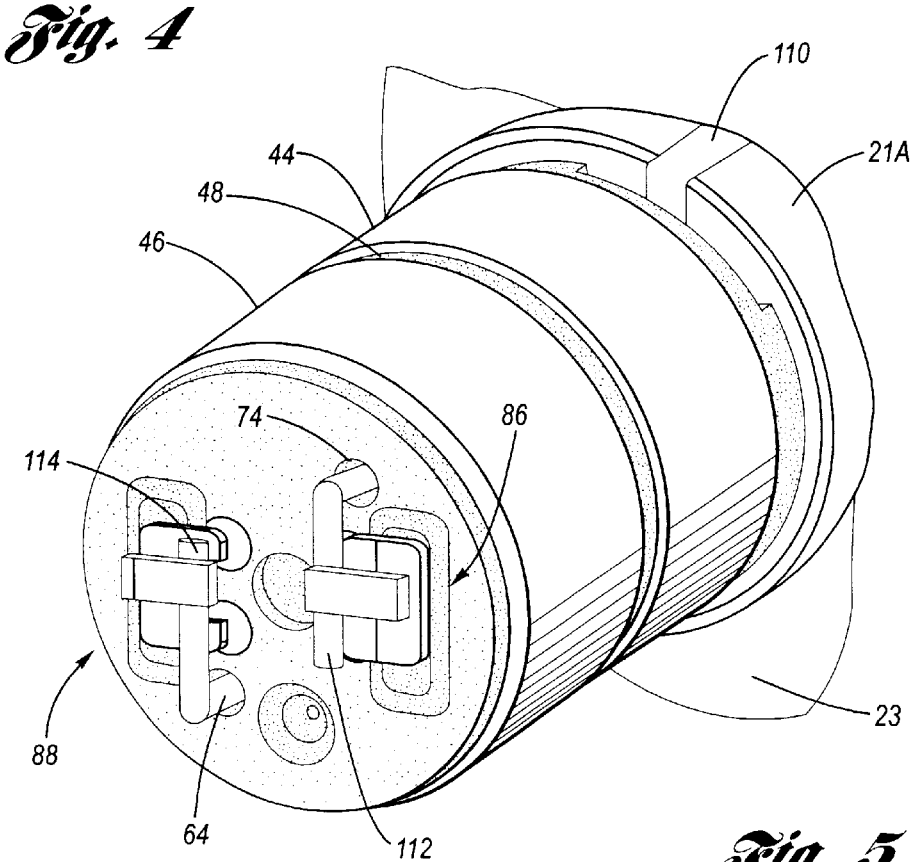
FIG. 5 is a simplified, perspective view showing the slip ring assembly of FIG. 3 assembled on a rotor shaft with rotor winding leads received respective coupling terminals.

Central bore 50 is configured (e.g., in size and shape) to engage a rotor shaft, such as rotor shaft 21 a in FIG. 5, in an interference fit arrangement. An inner surface of body portion 42 may be keyed to aid in the proper alignment of the rotor shaft, which is complementarily shaped. In the illustrated embodiment, body portion 42 is keyed by opposing flat surfaces 61 which correspond generally to flat surfaces on rotor shaft 21a (FIG. 5).

First through-bore 58 and second through-bore 60 are configured to allow passage of rotor winding leads therethrough, originating from the rotor-facing side 54 and emerging at the opposing side 56. Bores 58 and 60 each have a respective axis, designated "B" and "C", which, as illustrated, are substantially parallel to but radially offset from main axis "A". Bore 58 includes an entry aperture 62 and an exit aperture 64. A tapered portion 66 blends into a first portion 68 having a first diameter. Bore 58 further includes a second portion 70 having a second diameter extending from the first portion 68. Taper 66 is provided to facilitate entry of a rotor winding lead and an insulating sleeve that typically surrounds the lead. The first diameter of first portion 68 is larger than the second diameter of the second portion 70. This relationship allows the first portion to accommodate the rotor winding lead/insulating sleeve. The second diameter, however, is sized so that only the winding lead can pass through and emerge from exit aperture 64. This restriction as to the insulating sleeve prevents the insulating sleeve from exiting and interfering with the electrical connection of the winding lead to a coupling terminal (to be described in detail below). Second through-bore 60 also includes an entry aperture 72, an exit aperture 74, a taper 76, a first portion 78 having a first diameter, and a second portion 80 having a second diameter. The description provided for first through-bore 58 applies equally to second bore 60. In the illustrated embodiment, respective entry apertures are approximately 180° apart (as are the corresponding exit apertures).

Figure 3:
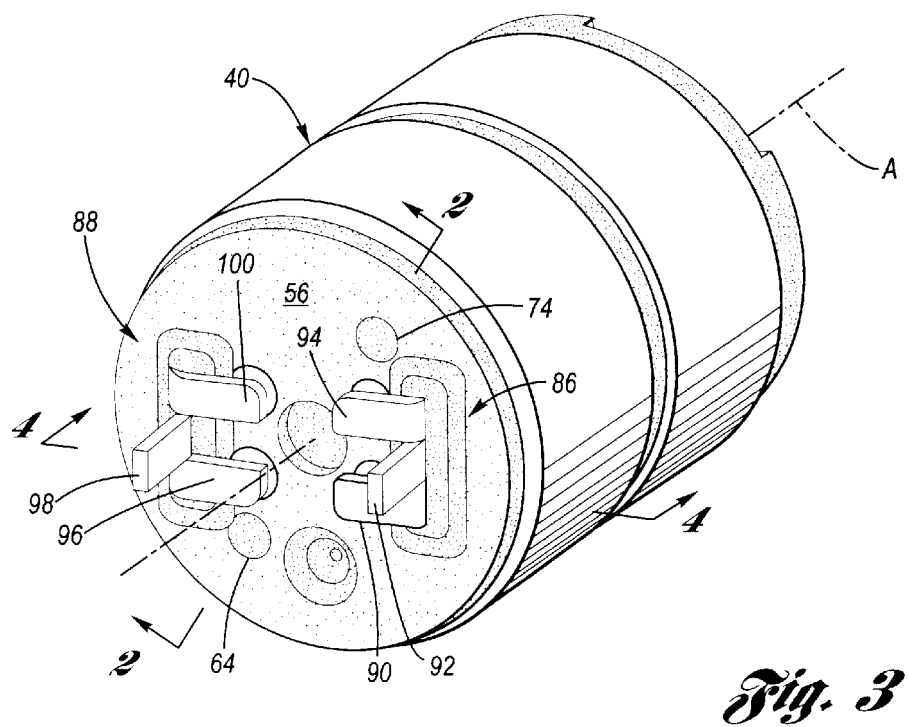
FIG. 3 is a perspective view of the slip ring assembly of FIG. 2 showing a second side opposite the rotor facing side.

FIG. 3 is a perspective view of slip ring assembly 40, with side 56 visible, which is opposite of FIG. 2, which has rotor-facing side 54 visible. FIG. 3 shows slip ring assembly 40 prior to being secured to a rotor shaft. Exit apertures 64 and 74 are shown.

Figure 4:
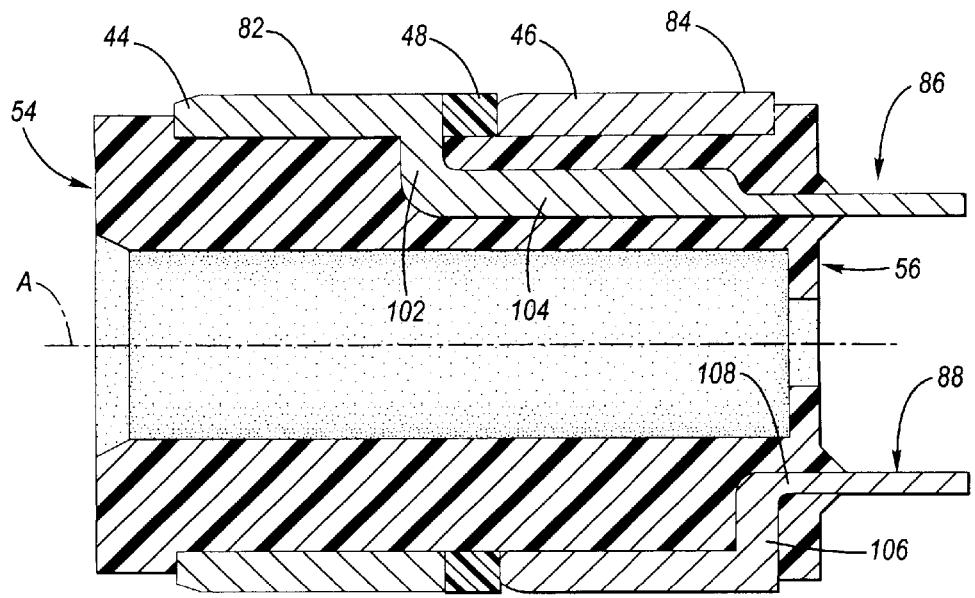
FIG. 4 is a simplified sectional view taken substantially along lines 4—4 in FIG. 3.

FIG. 4 is a sectional view of slip ring assembly 40 taken substantially along lines 4—4 in FIG. 3. First and second slip rings 44 and 46 are formed of electrically conductive material, such as copper, and are axially spaced apart and insulated from each other by spacing member 48, which may be an electrically insulating washer. The slip rings 44, 46 engage outer surface 52 of insulating body portion 42 as shown in FIG. 2. Slip rings 44 and 46 include circumferentially continuous portions 82, 84, respectively. Slip rings 44 and 46 further include first and second coupling terminals 86, and 88, respectively, extending, generally axially, from side 56. The coupling terminals are configured for connecting the slip rings to a corresponding rotor winding lead. As shown in FIG. 4, slip ring 44 includes a first intermediate portion 102 that extends radially inwardly, and a second intermediate portion 104 which extends axially towards side 56. Likewise, slip ring 46 includes a first intermediate portion 106 that extends radially inwardly, and a second intermediate to portion 108 that extends axially towards side 56.

Referring again to FIG. 3, each coupling terminal 86, 88 includes a plurality of legs arranged to receive a respective rotor winding leads. In the illustrated embodiment, coupling terminal 86 includes first, second and third legs 90, 92, and 94. First and third legs 90, 94 extend radially toward main axis "A" via bending by approximately 90°, while second leg 92 extends axially, at least initially (i.e., prior to connection to the rotor winding leads). Likewise, coupling terminal 88 includes first, second and third legs 96, 98 and 100, arranged in the same manner as terminal 86.

There are a variety of well-known approaches for manufacturing the slip ring assembly 40 described above. In one embodiment, the slip rings may be manufactured using conventional cold forming techniques. The combination of slip rings 44, 46 and washer 48 are sandwiched together and are insert molded to insulator body portion 42 such that coupling terminals 86 and 88 axially extend out of side 56. This axial end of the slip rings is then axially split, with portions bent, as described above and shown in FIG. 3 to form the coupling terminals 86, 88. A variety of plastic materials may used for insulator body portion 42, depending on the particular molding operation used, the contemplated operating temperature to which the slip ring assembly will be subjected, and other parameters known to those of ordinary skill. In one embodiment, the insulating material may be polyphenylene sulfide (PPS).

With reference to FIG. 5, assembly of the slip ring assembly 40 will now be described. A pair of rotor winding leads 112 and 114 are routed through opposing channels 110 (only the top channel shown) of shaft 21a. Leads 112 and 114 are inserted through entry apertures 72 and 62, respectively, and routed through the remainder of through-bores 60 and 58. The leads 112, 114 emerge from exit apertures 74 and 64. The routing of the leads occurs as shaft 21a is inserted into central bore 50. The slip ring assembly 40 is then pressed until it seats on a shoulder of the shaft 21a, leaving an exposed portion of the leads 112, 114 extending out of exit the apertures. Lead 112 is then bent across legs 90 and 94 (see FIG. 3 for further reference), while lead 114 is bent across legs 96 and 100. Center legs 92 and 98 are then folder over the leads 112, 114 to mechanically secure the connection (as shown in FIG. 5). Then, in a preferred embodiment, a soldering operation is performed to ensure electrical connectivity. A plurality of conventional soldering approaches (as well as soldering materials) may be used, as known to one of ordinary skill in the art, depending on contemplated operating conditions (e.g., temperature, rotational speed, etc). In one embodiment, a tin/antimony (e.g., 95% Sn/5%Sb) type solder provided satisfactory results. Other approaches for ensuring electrical connection, such as various welding operations, may also be used, and remain within the spirit and scope of the present invention (e.g., for elevated temperature conditions higher than the melting point of a solder compound).

A slip ring assembly in accordance with the present invention provides a dimensionally low profile electrical connection that is process friendly relative to conventional approaches, and overcomes such problems as described in the Background. The novel coupling terminals of the present invention further provides a robust mechanical and electrical connection, which is subjected to a reduced centrifugal force during operation, due to its location being nearer the main axis of the slip ring assembly than conventional configurations. The novel configuration of the through-bore of the insulator body allows an insulating sleeve to enter but not exit, which eliminates the risk that the sleeve will interfere with electrical connections. The slip ring assembly in accordance with the invention eliminates two of the four conventional electrical connections (i.e., the weld connections for the two rotor winding leads that are made near the surface of the fan, as described in the Background). This eases manufacturing by reducing the number of process steps, and further reduces quality issues that may otherwise arise due to electrical connections opening up during operation.

What is claimed is:

1. A slip ring assembly for supplying current to a rotor winding of a rotor of an alternating current generator comprising:
    a body portion having a main axis formed of electrical insulating material with a central bore configured to be secured to a rotatable rotor shaft of the generator, said body portion having first and second opposing ends, said first end configured to face said rotor, said body portion having a pair of longitudinally extending through-bores configured to allow rotor winding leads to pass therethrough;
    a pair of spaced electrically conductive slip rings engaging said body portion, each slip ring having a respective coupling terminal extending from said second end of said body portion.

2. The slip ring assembly of claim 1 wherein said through-bores each have a respective axis parallel to said main axis and radially offset therefrom.

3. The slip ring assembly of claim 1 wherein said through-bores each have a respective entry aperture having an entry diameter and exit aperture having an exit diameter less than said entry diameter.

4. The slip ring assembly of claim 3 wherein said entry diameter is sized so as to accommodate one of said rotor winding leads and an insulating sleeve disposed outwardly thereof.

5. The slip ring assembly of claim 4 wherein said exit diameter is sized so as to allow passage of one of said rotor winding leads and restrict passage of said insulating sleeve.

6. The slip ring assembly of claim 3 wherein said entry aperture is tapered.

7. The slip ring assembly of claim 1 further including an annular insulating washer disposed between said slip rings.

8. The slip ring assembly of claim 1 wherein said coupling terminal comprises a plurality of legs.

9. The slip ring assembly of claim 8 wherein at least one of said plurality of legs extends axially and at least one of said plurality of legs extends radially.

10. The slip ring assembly of claim 9 wherein each of said coupling terminals comprises three legs, a first leg that extends radially, a second leg that extends axially, and a third leg that extends radially, said second leg being between said first and third legs.

11. The slip ring assembly of claim 10 wherein said first and third legs extend toward said main axis.

12. The slip ring assembly of claim 11 wherein said coupling terminal is configured to receive said rotor winding lead on a radially innermost side of said second leg such that said lead is urged against said second leg by a centrifugal force when the slip ring assembly is rotated.

13. The slip ring assembly of claim 10 wherein said rotor winding lead is electrically connected to said coupling terminal by one of a soldering or welding operation.

14. The slip ring assembly of claim 1 wherein said central bore is configured to engage said rotor shaft in an interference fit arrangement.

15. The slip ring assembly of claim 8 wherein said coupling terminals each comprise a plurality of legs.

16. A slip ring assembly for supplying current to a rotor winding of a rotor of an alternating current generator comprising:
    a body portion having a main axis formed of electrical insulating material with a central bore configured to be secured to a rotatable rotor shaft of the generator, said body portion having first and second opposing ends, said first end configured to face said rotor, said body portion having a pair of longitudinally extending through-bores configured to allow rotor winding leads to pass therethrough, said through-bores each have a respective entry aperture that is enlarged relative to an exit aperture;
    a pair of spaced electrically conductive slip rings engaging an outer cylindrical surface of said body portion, each slip ring having a respective coupling terminal extending from said second end of said body portion, each coupling terminal comprising three legs, a first leg that extends radially, a second leg that extends axially, and a third leg that extends radially, said second leg being intermediate said first and third legs.

17. The slip ring assembly of claim 16 wherein said entry aperture is tapered.

* * * * *